May 26, 1964  B. A. PHILLIPS ETAL  3,134,245
ABSORPTION REFRIGERATION APPARATUS
Filed June 16, 1961
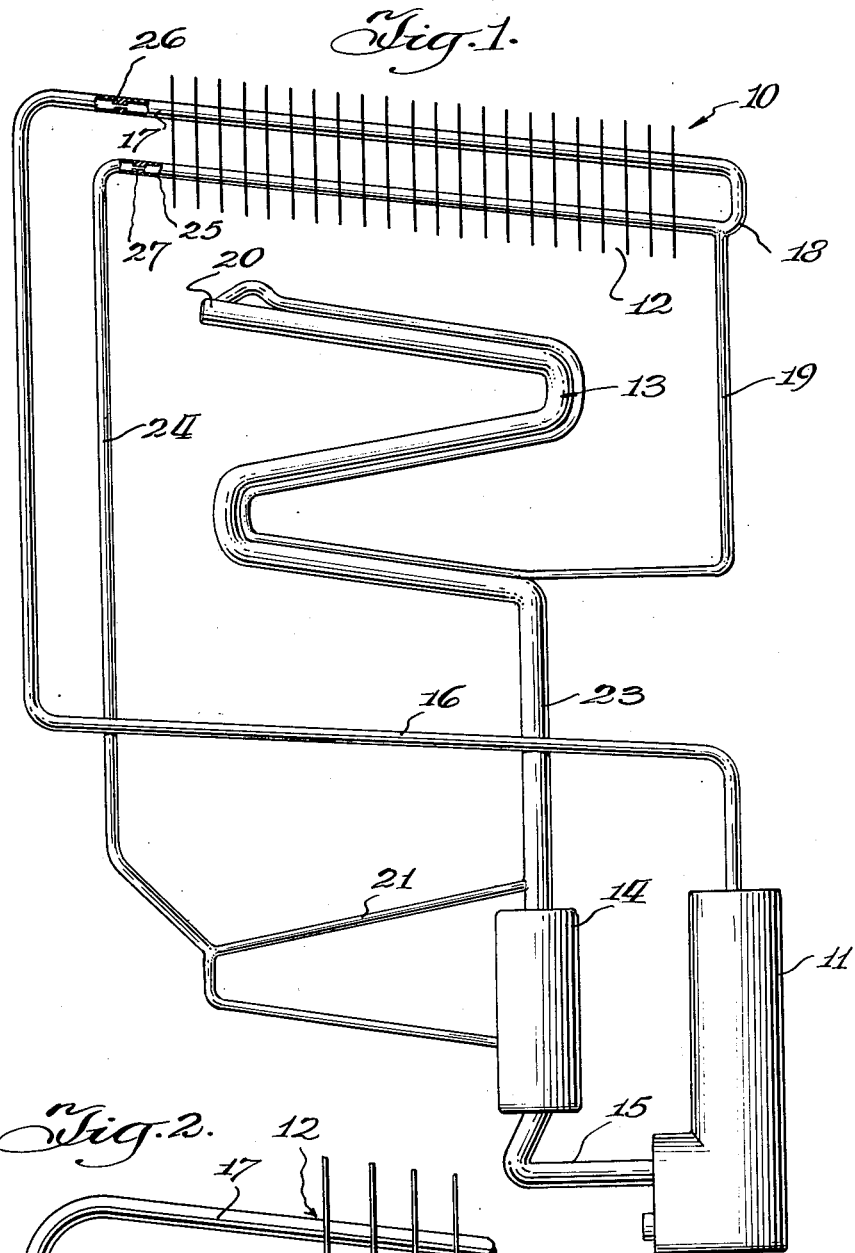
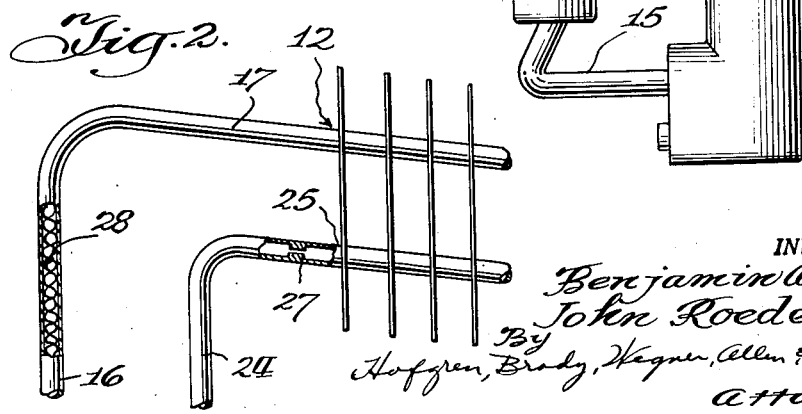
INVENTORS.
Benjamin A. Phillips
John Roeder Jr.
By Hofgren, Brady, Wegner, Allen & Stillman
Attorneys United States Patent Office 3,134,245
Patented May 26, 1964

3,134,245
ABSORPTION REFRIGERATION APPARATUS
Benjamin A. Phillips and John Roeder, Jr., Benton Harbor, Mich., assignors to Whirlpool Corporation, a corporation of Delaware
Filed June 16, 1961, Ser. No. 117,564
4 Claims. (Cl. 62—490)

This invention relates to refrigeration apparatus and in particular to absorption refrigeration apparatus.

In the absorption refrigeration apparatus, the refrigerant is separated from the rich liquid in a generator and delivered therefrom as a gaseous fluid to a condenser wherein the refrigerant is liquified. The conventional generator also functions as a vapor-lift pump, utilizing the vaporized refrigerant to pump the resultant weak liquid from the generator to an associated absorber. As a result of this vapor-lift pumping action, however, the refrigerant is delivered to the condenser in surges or pulses. Heretofore, condensers for use with such generators have been relatively large to prevent passage from the condenser of gaseous refrigerant as a result of the periodic pressure surges. Further, it has heretofore been necessary to maintain a relatively high pressure in the refrigeration system to prevent passage of the gaseous refrigerant from the condenser as a result of such pressure surges. The present invention comprehends an improved absorption refrigeration apparatus permitting a substantial reduction in the minimum required pressure and/or a substantial reduction in the size of the condenser thereof.

Thus, a principal feature of the present invention is the provision of a new and improved absorption refrigeration apparatus.

Another feature of the invention is the provision of such absorption refrigeration apparatus including means for steadying the flow of refrigerant through the condenser to permit the use of a relatively low pressure in the refrigeration system and/or a relatively small condenser.

A further feature of the invention is the provision of such absorption refrigeration apparatus wherein the flow steadying means includes means for dropping the pressure of the refrigerant in at least one of the inlet and the outlet of the condenser.

Other features and advantages of the invention will be apparent from the following description taken in connection with the accompanying drawing wherein:

FIGURE 1 is a schematic elevation of an absorption refrigeration apparatus with portions broken away to illustrate the provision therein of a flow steadying structure embodying the invention; and FIGURE 2 is an enlarged fragmentary elevation of a portion thereof.

In the exemplary embodiment of the invention as disclosed in the drawing, an absorption refrigeration apparatus generally designated 10 includes a generator 11, a condenser 12, an evaporator 13, and absorbers 14 and 21, each of substantially conventional construction. Herein, the refrigerant fluids illustratively comprise ammonia as the refrigerant, water as the solvent and hydrogen as the inert gas; it being understood that any other suitable fluid system may be utilized.

Generator 11 is arranged to boil the ammonia refrigerant from the rich solution thereof delivered from the absorber 14 through a conduit 15 to the generator. The resultant vaporized refrigerant, as is conventional in such generators, is utilized as a vapor-lift pump means to pump the resultant weak liquid back to the absorber through another portion of conduit 15. As a result of the pulsating pumping action of such a vapor-lift pump means, the vaporized ammonia refrigerant passes through a rectifier conduit 16 to the inlet 17 of the condenser 12 in pulses. In the condenser 12, the vaporized refrigerant is condensed and delivered therefrom at a lower end 18, through a liquid conduit 19 to the upper end 20 of evaporator 13. The inert gas, herein hydrogen, is delivered from absorber portions 14 and 21 to the evaporator 13 at the upper end 20 thereof by means of an internal conduit. The liquid refrigerant vaporizes in the evaporator 13 and the resultant mixture of vaporized refrigerant and hydrogen gas, commonly called "rich gas," is delivered to the absorber 14 through a return conduit 23. This conduit 23 contains the internal conduit for the hydrogen. A vent conduit 24 is preferably connected between the absorber 14 and the vent end 25 of the condenser 12. However, it may be connected to the lower end of evaporator 13 or to the return conduit 23.

The present invention comprehends the provision in refrigeration apparatus 10 of means for steadying the flow of refrigerant through the condenser 12 and, thereby, precluding the undesirable periodic forcing of refrigerant vapor from condenser 12 through conduit 24 to the absorber 21, while yet permitting the pressure within the apparatus 10 (as determined by the charging pressure of the hydrogen gas therein) to be relatively low. More specifically, the invention comprehends the provision in apparatus 10 of means for dropping the pressure between the supply conduit 16 and the vent tube 24. In the illustrated embodiment of FIGURE 1, the pressure dropping means comprises a first orifice device 26 at the inlet 17 of the condenser 12, and a second orifice device 27 at the end 25 of the condenser 12. Illustratively, in a conventional refrigeration apparatus, the tubes defining the rectifier 16 and the condenser 12 may have an outer diameter of one-half inch and a wall thickness of .049 inch so they act as surge chambers. In such an apparatus, orifices having a 5/64 inch diameter opening and a length of 1/16 inch may be utilized for each of orifice devices 26 and 27 to provide a drop of approximately fifteen percent in the required operating pressure of the apparatus. Such a drop in the required pressure permits increased efficiency of the apparatus as it allows an increased heat input to the generator 11 permitting more refrigerant to be vaporized therein. Further, as a greater amount of refrigerant is removed from the rich liquid in the generator, the resultant weak liquid is weaker and more efficiently absorbs the refrigerant vapor from the rich gas in the absorber.

The use of only one orifice device selectively at the inlet end 17 or vent end 25 of the condenser 12 reduces the pulsations of the refrigerant vapor in the condenser 12 to a lesser degree. Illustratively, where only the orifice device 26 is provided in the apparatus 10, a drop in the required pressure of the system of approximately eight percent has been found to result.

Referring more specifically to FIGURE 2, another form of means for steadying the flow of refrigerant through the condenser 12 is shown to comprise a helicoid 28 disposed in the rectifier tube 16. Additionally, the helicoid 28 provides improved rectification of the refrigerant vapor delivered from the generator 11 to the condenser 12. Illustratively, in a refrigeration apparatus provided with a helicoid 28 in the rectifier tube 16 and an orifice 27 at the end 25 of the condenser 12, a drop in the required pressure of the system of over twelve percent has been obtained.

Having described our invention as related to the embodiment set out herein, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. In an absorption refrigeration apparatus having a refrigerant vapor system comprising an absorber, a condenser, an evaporator, a duct means for conducting refrigerant to the condenser, duct means for conducting liquid refrigerant from the condenser to the evaporator, duct means for conducting refrigerant vapor from the evaporator to the absorber, vent means providing communication between the condenser and the absorber, a generator for delivering said refrigerant vapor in pulses through said duct means to the condenser, and duct means for conducting refrigerant rich solution from the absorber to the generator, structure for steadying the flow of said refrigerant vapor in said system comprising pressure drop means located in at least one of said refrigerant vapor duct means and said refrigerant vapor vent means for substantially eliminating said pulses.

2. The apparatus of claim 1 wherein a said pressure drop means is located in said refrigerant vapor duct means adjacent said condenser.

3. The apparatus of claim 1 wherein a pair of said pressure drop means is provided, one in said refrigerant vapor duct means adjacent said condenser and the other in said refrigerant vapor vent means adjacent said condenser.

4. The apparatus of claim 3 wherein said one pressure drop means comprises a helicoid.

References Cited in the file of this patent

UNITED STATES PATENTS

| | | |
|---|---|---|
| 1,702,754 | Wessblad | Feb. 19, 1929 |
| 1,878,831 | Cummings | Sept. 20, 1932 |